(12) United States Patent
Hoshiba et al.

(10) Patent No.: US 8,460,749 B2
(45) Date of Patent: Jun. 11, 2013

(54) BINDER FOR ELECTRODE OF NON-AQUEOUS ELECTROLYTE SECONDARY BATTERY, ELECTRODE, AND NON-AQUEOUS ELECTROLYTE SECONDARY BATTERY

(75) Inventors: Koji Hoshiba, Tokyo (JP); Eitaro Nakamura, Tokyo (JP)

(73) Assignee: Zeon Corporation, Tokyo (JP)

( * ) Notice: Subject to any disclaimer, the term of this patent is extended or adjusted under 35 U.S.C. 154(b) by 1602 days.

(21) Appl. No.: 11/886,773

(22) PCT Filed: Mar. 23, 2006

(86) PCT No.: PCT/JP2006/305877
§ 371 (c)(1),
(2), (4) Date: Sep. 20, 2007

(87) PCT Pub. No.: WO2006/101182
PCT Pub. Date: Sep. 28, 2006

(65) Prior Publication Data
US 2009/0053603 A1 Feb. 26, 2009

(30) Foreign Application Priority Data
Mar. 23, 2005 (JP) .................................. 2005-084312

(51) Int. Cl.
*H01M 4/62* (2006.01)
*C08F 30/02* (2006.01)

(52) U.S. Cl.
USPC ....................................... 427/217; 252/282.1

(58) Field of Classification Search
USPC . 429/217; 252/282.1; 525/535, 538; 526/274
See application file for complete search history.

(56) References Cited

U.S. PATENT DOCUMENTS

| | | | |
|---|---|---|---|
| 5,387,367 A | 2/1995 | Haeberle et al. | |
| 5,846,674 A | 12/1998 | Sakai et al. | |
| 7,316,864 B2 * | 1/2008 | Nakayama et al. | 429/217 |
| 2003/0118904 A1 * | 6/2003 | Hosokawa et al. | 429/217 |
| 2004/0151886 A1 * | 8/2004 | Bobsein et al. | 428/211.1 |
| 2007/0274023 A1 * | 11/2007 | Mori et al. | 361/502 |

FOREIGN PATENT DOCUMENTS

| | | |
|---|---|---|
| JP | 5-74461 A | 3/1993 |
| JP | 6-325752 A | 11/1994 |
| JP | 11-25989 A | 1/1999 |
| JP | 2000-200608 A | 7/2000 |
| JP | 2000-228197 A | 8/2000 |
| JP | 2001-283853 A | 10/2001 |
| JP | 2001-332265 A | 11/2001 |
| JP | 2002-42819 A | 2/2002 |
| JP | 2003-151560 A | 5/2003 |
| JP | 2003-223896 A | 8/2003 |
| JP | 2003-317722 A | 11/2003 |

OTHER PUBLICATIONS

Chinese Office Action date Mar. 10, 2010 issued in corresponding Chinese Patent Application No. 2009100070696.
Japanese Notice of Reason(s) for Rejection dated Feb. 14, 2012 for Application No. 2007-509339.

* cited by examiner

*Primary Examiner* — Mark F Huff
*Assistant Examiner* — Monique Wills
(74) *Attorney, Agent, or Firm* — Birch, Stewart, Kolasch & Birch, LLP

(57) ABSTRACT

The present invention provides a binder for an electrode of a non-aqueous electrolyte secondary battery comprising a copolymer, wherein the copolymer contains 0.0005~0.05 moles of group of an acid having nitrogen family element or chalcogen element or 0.0005~0.05 moles of group of salts of the acid per 100 g of the copolymer. The binder exhibits excellent dispersion of an active material for an electrode. The invention also provides an electrode for a non-aqueous electrolyte secondary battery, in which the active material layer formed by the composition for an electrode containing the above binder and the active material for an electrode is adhered to the current collector, in which the active material for an electrode is densely-filled, and which exhibits excellent surface smoothness.

16 Claims, No Drawings

BINDER FOR ELECTRODE OF NON-AQUEOUS ELECTROLYTE SECONDARY BATTERY, ELECTRODE, AND NON-AQUEOUS ELECTROLYTE SECONDARY BATTERY

TECHNICAL FIELD

The present invention relates to a binder which can be used for production of a non-aqueous electrolyte secondary battery such as a lithium ion secondary battery, a binder composition including the binder, and a composition for an electrode. The present invention also relates to an electrode using the above composition for an electrode, and a non-aqueous electrolyte secondary battery with use of the electrode.

BACKGROUND ART

A non-aqueous electrolyte secondary battery such as a lithium ion secondary battery is highly valued in view of high energy density. Instead of conventional secondary batteries like a lead secondary battery, a nickel-cadmium (Ni—Cd) secondary battery, a nickel-hydride secondary battery, the non-aqueous electrolyte secondary battery is becoming the major player of the compact size secondary battery for electronic devices. This secondary battery is further expected to be used for power system of automobiles and so on. In order to obtain higher power density, various studies were made over the issues like: pursuing higher capacity of active materials and higher filling of the same in the electrode; thickening of electrode layer; and making the separator and the current collector be thinner.

However, when blending ratio of binder is reduced to densely-fill the active materials in the electrodes, the electrodes become brittle, which tends to cause an increase of fraction defective in the cutting process thereof and assembly process of the battery, but also cause a decline of batteries' cycle characteristic. In addition, when blending ratio of an electroconductive material is reduced in the electrodes, there is a problem that rate performance of the battery declines.

Moreover, if the surface of electrodes is not flat and smooth, the distance between the positive and the negative electrodes separated by a separator becomes locally closer. Thereby electrical current concentrates on a particular point and there is a fear of cause of local heat. So, in general, by using methods like roll-press after forming of electrode layers, the surface of electrodes is made flat and smooth, and density of electrode layers can be improved. Nevertheless, if the electrode layers before roll-press have rough surface and low density, the smooth surface is hard to be obtained even by a treatment with the larger compressed pressure. If filling ratio of active materials is forcibly raised with high pressure, microscopic cracks grow within the electrode layers at a time of compression. As a result, the electrode layers become brittle, which cause an increase of defective in the cutting process thereof and the assembly process of the battery.

When thicken electrode layers, it is capable to increase the ratio of active materials in the battery, therefore it is advantageous for enlarge the energy density. However, the thickened electrode layers have problems like: an increase of defective in the assembly process of battery due to the lack of flexibility of the electrodes; and a decline of battery's rate performance as a result of the longer average distance to the current collector.

An idea adopting rubber-type materials as a binder is proposed to enhance the flexibility of electrodes and to maintain the above-mentioned cycle characteristic in order to reduce the damage of electrodes in the cutting and winding processes (e.g., Patent Documents 1~3). Another idea is proposed to obtain an electrode which is excellent in flexibility and adhesiveness by using reactive-hardening type binder (Patent Document 4).

Patent Document 1: Japanese Patent Application Laid-Open (JP-A) No. 5-74461
Patent Document 2: JP-A No. 2000-200608
Patent Document 3: JP-A No. 2000-228197
Patent Document 4: JP-A No. 6-325752
Patent Document 5: U.S. Pat. No. 5,846,674

DISCLOSURE OF THE INVENTION

Problems to be solved by the Invention

However, when slurry for an electrode is produced by using binder described in the above Patent Documents 1~5, the obtained slurry often becomes insufficient in dispersion of active materials and electroconductive materials, but also insufficient in coating property. Therefore, with such binder, it is difficult to obtain an electrode in which the active material is densely-filled and which has damage-resistance.

Accordingly, an object of the present invention is to provide a binder for an electrode of a non-aqueous electrolyte secondary battery which is excellent in dispersion of an active material for an electrode. Also, another object of the invention is to provide an electrode for a non-aqueous electrolyte secondary battery in which an active material is densely-filled and which is excellent in smoothness of the surface. Furthermore object of the invention is to provide a non-aqueous electrolyte secondary battery which is excellent in the rate performance and the cycle characteristic.

Means for Solving the Problems

The present inventors have carried out serious studies so as to achieve the objects. As a result, the inventors have acquired the facts as follows: by using a copolymer containing a group of acid having nitrogen family element or chalcogen element or a group of the salt of the acid as a binder, the dispersion of an active material for an electrode is excellent; the electrode manufactured with use of the above binder has excellent strength and surface smoothness; and by using this electrode, it is capable to obtain a non-aqueous electrolyte secondary battery which is excellent in the rate performance and cycle characteristic. Thus, the inventors completed the present invention.

According to the present invention, the following invention can be provided.

(1) A binder for an electrode of a non-aqueous electrolyte secondary battery comprising a copolymer, wherein the copolymer contains 0.0005~0.05 moles of a group of an acid having nitrogen family element or chalcogen element or 0.0005~0.05 moles of a group of salts of the acid, per 100 g of the copolymer.

The wording "chalcogen element" means a narrow definition of chalcogen element, that is an atomic group consisting of sulfur, selenium, and tellurium.

(2) In the above binder for an electrode of a non-aqueous electrolyte secondary battery, the nitrogen family element or chalcogen element is preferably phosphorus atom or sulfur atom.

(3) In the above binders for an electrode of a non-aqueous electrolyte secondary battery, wherein the copolymer preferably contains 50~99.9 weight % of structural unit represented by a general formula (A) shown as follows:

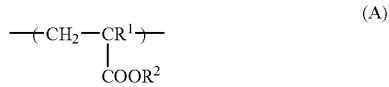

(A)

(in the formula, $R^1$ is a hydrogen atom or a methyl group, $R^2$ is an alkyl group or a cycloalkyl group of carbon number 1~16.).

(4) In the binder for an electrode of a non-aqueous electrolyte secondary battery described in the above (3), in the structural unit of the copolymer represented by the general formula (A), weight of the structural unit represented by the general formula (A) whose $R^2$ is an alkyl group of carbon number 1~6 is preferably 50 weight % or more.

(5) In the above binders for an electrode of a non-aqueous electrolyte secondary battery, the copolymer preferably further contains a cross-linking group.

(6) In the above binders (5) for an electrode of a non-aqueous electrolyte secondary battery, the cross-linking group is preferably at least one selected from a group consisting of an epoxy group and a hydroxyl group.

(7) A binder composition for an electrode of a non-aqueous electrolyte secondary battery containing a binder for an electrode of the non-aqueous electrolyte secondary battery described as above and a compound crosslinkable with the binder for an electrode of a non-aqueous electrolyte secondary battery.

(8) A composition for an electrode of a non-aqueous electrolyte secondary battery containing the above binder for an electrode of a non-aqueous electrolyte secondary battery and an active material for an electrode.

(9) An electrode for a non-aqueous electrolyte secondary battery, wherein an active material layer formed with use of the composition for an electrode of a non-aqueous electrolyte secondary battery described in the above (8) is adhered to a current collector.

(10) A non-aqueous electrolyte secondary battery comprising an electrode for a non-aqueous electrolyte secondary battery described in the above (9), an electrolytic solution, and a separator.

Effects of the Invention

According to the present invention, provided is a binder for an electrode of a non-aqueous electrolyte secondary battery which is excellent in dispersibility of an active material for an electrode. When an electrode is manufactured with use of this binder, an active material for an electrode can be densely-filled, thereby it is capable to obtain an electrode having excellent strength and surface smoothness. Also, by using this electrode, it is capable to obtain a non-aqueous electrolyte secondary battery which is excellent in the electric discharge rate performance and cycle characteristic.

BEST MODE FOR CARRYING OUT THE INVENTION

A Binder for an Electrode of a Non-Aqueous Electrolyte Secondary Battery

A binder for an electrode of a non-aqueous electrolyte secondary battery of the present invention (hereinafter, it may simply refer to "binder".) comprises a copolymer containing a group of an acid having nitrogen family element or chalcogen element or a group of salts of the acid.

By using such a copolymer, it is capable to obtain a composition for an electrode having excellent dispersibility of an active material for an electrode. In the invention, the wording "nitrogen family element" means an atomic group consisting of nitrogen, phosphorus, arsenic, antimony, and bismuth. While, in the invention, the wording "chalcogen element" means a narrow definition of chalcogen element, that is an atomic group consisting of sulfur, selenium, and tellurium. Among them, as the nitrogen family element, phosphorus is preferred; as chalcogen element, sulfur is preferred.

As a group of an acid having nitrogen family element or chalcogen element or a group of salts of the acid, a strong electrolyte group of large dissociation degree may be a preferable example. Specifically the examples include a group of strong acid containing sulfur atom or phosphorus atom, such as sulfate group, sulfonate group, phosphate group, acidic phosphoester group, and phosphonate group, or a group of salts of such acid.

The content of a group of an acid having nitrogen family element or chalcogen element or a group of salts of the acid in the copolymer is 0.0005~0.05 moles per 100 g of the copolymer. It is preferably 0.001~0.02 moles, furthermore preferably 0.002~0.01 moles. When the content of the above group of an acid having nitrogen family element or chalcogen element or a group of salts of the acid is within the range, it is possible to obtain a battery which is excellent in dispersibility of an active material for an electrode and which has favorable rate performance.

Such a content of the group of an acid having nitrogen family element or chalcogen element or the group of salts of the acid in the above copolymer can be measured by elemental analyses detecting the content of nitrogen family element or chalcogen element in the copolymer.

Examples of manufacturing method of the copolymer for the use of binder of the invention are as follows:
(the first method) a method to copolymerize a monomer containing a group of an acid having nitrogen family element or chalcogen element or a group of salts of the acid and a polymerizable monomer which is copolymerizable with the above monomer; (the second method) a method of adding a compound containing a group of an acid having nitrogen family element or chalcogen element or a group of salts of the acid to the copolymer obtained by the above polymerizable monomer; (the third method) a method to copolymerize the above polymerizable monomer by using a radical initiator containing a group of an acid having nitrogen family element or chalcogen element or a group of salts of the acid.

Examples of a monomer of the above (the first method) containing a group of an acid having nitrogen family element or chalcogen element or a group of salts of the acid include: a monomer containing a group of strong acid salts having sulfur atom such as unsaturated organic sulfonate and unsaturated organic sulfate salt; and a monomer containing a group of strong acid salts having phosphorus atom such as unsaturated organic phosphate and unsaturated organic phosphonate.

Specifically, examples of unsaturated organic sulfonate include an alkali metal salt or an ammonium salt of organic sulfonates such as vinyl sulfonate, methyl vinyl sulfonate, allyl (or methallyl) sulfonate, styrene sulfonate, acrylic (or methacrylic) acid-2-ethyl sulfonate, 2-acrylamide-2-methylpropane sulfonate, and 3-allyoxy-2-hydroxypropane sulfonate. Also, as examples of unsaturated organic sulfate salt include an alkali metal salt and an ammonium salt of organic sulfate such as acrylic (or methacrylic) acid-2-ethyl sulfate and 3-allyoxy-2-hydroxypropane sulfate.

The examples of unsaturated organic phosphate include an alkali metal salt or an ammonium salt of organic phosphoric acid such as acrylic (or methacrylic) acid-3-chloro-2-propyl phosphate, acrylic (or methacrylic) acid-2-ethyl phosphate, and 3-allyoxy-2-hydroxypropane phosphate. Also, the examples of unsaturated organic phosphonate include an alkali metal salt or an ammonium salt of organic phosphonic acid such as vinyl phosphonic acid, acrylamide methane phosphonic acid, 2-ethyl phosphonate-acrylate (or methacrylate), and 3-alyoxy-2-hydroxypropane phosphonate.

The skeleton (main chain) of copolymer used for the present invention can be randomly selected from a group consisting of: polymethylene and polybutadiene composed of carbon chain, and substitutes thereof; a complex linear polymer compound such as polyether, polyester, polyamide, polyimide, and polyurethane, polyurea, and complexes or substitutes of the complex linear polymer.

The skeleton (main chain) of the copolymer is preferably a polymethylene composed of carbon chain and substitutes thereof among the above group. Particularly, the copolymer preferably contains, to the total weight of the above copolymer (100 weight %), 50~99.9 weight % of structural unit represented by a general formula (A) shown as follows:

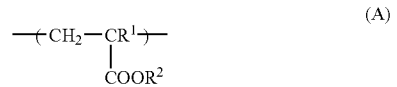
(A)

(in the formula, $R^1$ is a hydrogen atom or a methyl group, $R^2$ is an alkyl group or a cycloalkyl group of carbon number 1~16.).

In addition, to the total weight of structural unit of the above copolymer represented by the general formula (A) (100 weight %), the amount of the structural unit represented by the general formula (A) whose $R^2$ is an alkyl group of carbon number 1~6 is preferably 50 weight % or more. By using the copolymer in this range, the obtained composition for an electrode exhibits excellent fluidity, thereby it is capable to obtain an electrode having high surface smoothness.

In order to form such a skeleton (main chain) of the copolymer, as a polymerizable monomer to be used for (the first method), (the second method), and (the third method), for example, there may be an acrylic acid alkyl ester and a methacrylic acid alkyl ester both of whose carbon number of the alkyl group connected to a non-carbonyl oxygen atom is 1~6. Specific examples thereof include: an acrylic acid alkyl ester such as methyl acrylate, ethyl acrylate, n-propyl acrylate, isopropyl acrylate, n-butyl acrylate, t-butyl acrylate, and hexyl acrylate; and a methacrylic acid alkyl ester such as methyl methacrylate, ethyl methacrylate, n-propyl methacrylate, isopropyl methacrylate, n-butyl methacrylate, t-butyl methacrylate, and hexyl methacrylate. By using these materials as a polymerizable monomer, it is possible to obtain a copolymer having structural unit whose $R^2$ shown in the general formula (A) is an alkyl group of carbon number 1~6.

Further, as another polymerizable monomer, there may be an acrylic acid alkyl ester and methacrylic acid alkyl ester both of whose carbon number of the alkyl group connected to a non-carbonyl oxygen atom is 7~16. Specific examples thereof include an acrylic acid alkyl ester such as 2-ethylhexyl acrylate, dodecyl acrylate, lauryl acrylate; and a methacrylic acid alkyl ester such as 2-ethylhexyl methacrylate, dodecyl methacrylate, lauryl methacrylate. By using these materials as a polymerizable monomer, it is possible to obtain a copolymer having structural unit whose $R^2$ shown in the general formula (A) is an alkyl group of carbon number 7~16.

As other polymerizable monomer, the examples include: an alkyl ester of unsaturated polyvalent carboxylic acid such as dimethyl fumarate, diethyl maleate, butylbenzyl maleate, diethyl itaconate, and diisopropyl itaconate; and an unsaturated carboxylic acid ester having an alkoxyl group such as 2-methoxyethyl acrylate and 2-methoxyethyl methacrylate; α,β-unsaturated nitrile such as acrylonitrile and methacrylonitrile; styrene series monomer such as styrene, α-methyl styrene, p-methyl styrene, and p-t-butyl styrene; carboxylic acid vinyl ester such as vinyl acetate and vinyl propionate; halogenated olefin such as vinyl chloride, vinyl fluoride, vinyl bromide, vinylidene chloride, vinylidene fluoride, trifluoroethylene, tetrafluoroethylene, and hexafluoropropylene; vinyl ether such as methyl vinyl ether, isobutyl vinyl ether, and cetyl vinyl ether; unsaturated carboxylic acid such as acrylic acid, methacrylic acid, maleic acid, and itaconic acid; unsaturated carboxylic acid anhydride such as maleic anhydride and itaconic anhydride; unsaturated carboxylic amide such as acrylamide, methacrylamide, N,N-dimethyl acrylamide, and N,N-dimethyl methacrylamide; α-olefin such as ethylene and propylene; and vinylidene cyanide.

The copolymer as a binder for the present invention is preferable to further contain a crosslinkable group. When the copolymer contains a crosslinkable group, it is capable to cross-link the binder by heat-treatment at a time of electrode manufacturing. Therefore, dissolution in the electrolytic solution and swelling of the binder itself can be inhibited, and a strong and flexible electrode can be obtained. The examples of a crosslinkable group include epoxy group, hydroxyl group, N-methylol amide group, and oxazoline group; among them, epoxy group and hydroxyl group are preferable.

In order to introduce the above crosslinkable group in the copolymer, as a polymerizable monomer to be used for the above-mentioned (the first method), (the second method), and (the third method), a monomer containing a crosslinkable group such as a monomer containing epoxy group, a monomer containing hydroxyl group, a monomer containing N-methylol amide group, and a monomer containing oxazoline group can be used. Examples of a monomer containing epoxy group include: glycidyl ethers of unsaturated alcohol such as allyl glycidyl ether and methallyl glycidyl ether; glycidyl esters of unsaturated carboxylic acid such as glycidyl acrylate, glycidyl methacrylate, glycidyl-p-vinyl benzoate, methyl glycidyl itaconate, glycidyl ethyl maleate, glycidyl vinyl sulfonate, glycidyl allyl sulfonate, and glycidyl methallyl sulfonate; and epoxide olefins such as butadiene monoxide, vinyl cyclohexene monoxide, and 2-methyl-5,6-epoxyhexene.

Examples of a monomer containing hydroxyl group include: unsaturated alcohol such as allyl (or methallyl) alcohol, 3-butene-1-ol, and 5-hexene-1-ol; alkanol esters of unsaturated carboxylic acid such as 2-hydroxyethyl acrylate, 2-hydroxypropyl acrylate, 2-hydroxyethyl methacrylate, 2-hydroxypropyl methacrylate, di-2-hydroxyethyl maleate, di-4-hydroxybutyl maleate, di-2-hydroxypropyl itaconate; esters of polyalkylene glycol with acrylic (or methacrylic) acid, represented by a general formula: $CH_2=CR^1-COO-(C_nH_{2n}O)_m-H$ (m is an integer from 2 to 9, n is an integer from 2 to 4, and $R^1$ is a hydrogen atom or a methyl group.);

monoacrylic acid (or methacrylic acid) esters of dicarboxylic acid dihydroxyester such as 2-hydroxyethyl-2'-acryloyl (or methacryloyl) oxyphthalate and 2-hydroxyethyl-2'-acryloyl (or methacryloyl) oxysuccinate; vinylethers such as 2-hydroxyethyl vinylether and 2-hydroxypropyl vinylether; monoallyl (or methallyl)ethers of alkylene glycol such as allyl (or methallyl)-2-hydroxy ethylether, allyl (or methallyl)-2-hydroxy propylether, allyl (or methallyl)-3-hydroxy propylether, allyl (or methallyl)-2-hydroxy buthylether, allyl (or methallyl)-3-hydroxy butylether, allyl (or methallyl)-4-hydroxy butylether, and allyl (or methallyl)-6-hydroxy hexylether; polyoxy alkyleneglycol monoallyl (or methallyl) ethers such as diethyleneglycol monoallyl (or methallyl)ether and dipropyleneglycol monoallyl (or methallyl)ether; halogenous substitute and hydroxyl substitute of monoallyl (or methallyl)ether of (poly) alkyleneglycol such as glycerin monoallyl (or methallyl)ether, allyl (or methallyl)-2-chloro-3-hydroxy propylether, and allyl (or methallyl)-2-hydroxy-3-chloro propylether; monoallyl (or methallyl)ether of polyvalent phenol and halogenous substitutes thereof such as eugenol and isoeugenol; and allyl (or methallyl) thioethers of alkylene glycol such as allyl (or methallyl)-2-hydroxyethylthioether and allyl (or methallyl)-2-hydroxy propylthioether.

As a monomer containing N-methylolamide group, there may be acryl (or methacryl) amides having methylol group like N-methylol acryl (or methacryl) amide.

As a monomer containing oxazoline group, there may be 2-vinyl-2-oxazoline, 2-vinyl-4-methyl-2-oxazoline, 2-vinyl-5-methyl-2-oxazoline, 2-isopropenyl-2-oxazoline, 2-isopropenyl-4-methyl-2-oxazoline, 2-isopropenyl-5-methyl-2-oxazoline, and 2-isopropenyl-5-ethyl-2-oxazoline.

The polymerization method in (the first method) is not particularly limited, any kind of method such as solution polymerization method, suspension polymerization method, and emulsion polymerization method can be used. Examples of a polymerization initiator to be used for the polymerization include: organic peroxide such as lauroyl, peroxide, diisopropyl peroxy dicarbonate, di-2-ethylhexyl peroxy dicarbonate, t-butyl peroxy pivalate, and 3,5,5-trimethyl hexanoyl peroxide; azo compound such as α,α'-azo (bis) isobutylonitrile; and persulfate such as ammonium persulfate and potassium persulfate.

As a suspension agent used for suspension polymerization, there may be cellulose derivatives such as polyvinyl alcohol, partially saponified polyvinyl acetate, and methyl cellulose; synthetic polymer such as polyvinyl pyrrolidone, maleic acid anhydride-vinyl acetate copolymer, and polyacrylamide; and natural polymer such as starch and gelatin. As an emulsifier used for emulsion polymerization, there may be anionic emulsifier such as sodium alkylbenzene sulfonate and sodium lauryl sulfate; and nonionic emulsifier such as polyoxyethylene alkylether and polyoxyethylene sorbitan fatty acid partial ester. If necessary, molecular weight modifier like trichloroethylene, thioglycol, and docecylmercaptan can be used. The above-mentioned polymerization initiator, monomer, suspension agent or emulsifier, and molecular weight modifier and the like may be added to the polymerization system all at once at the beginning of the polymerization. They may be added to in a couple of batches during the polymerization. The polymerization is usually carried out at the temperature of 35~80° C. under stirrer.

In the above (the second method), firstly a polymer is formed, then added is a compound containing a group of acid having nitrogen family element or chalcogen element or a group of the salt of the acid. In this case, the polymerization method, same as above, may be any one of solution polymerization method, suspension polymerization method, and emulsion polymerization method. Among them, the most suitable manufacturing method may be selected depending on the following addition reaction and designed characteristics of the obtained polymer. For instance, when addition reaction is carried out in water system, it is advantageous to obtain the polymer as a finer aqueous dispersive particle by emulsion polymerization method. While, the addition reaction is carried out in solvent system, it is preferable to adopt solution polymerization method, or suspension polymerization method using lower alcohol like methanol. Nevertheless, normal suspension polymerization method can also be carried out.

Examples of a compound containing a group of acid having nitrogen family element or chalcogen element or a group of the salt of the acid to be added to the polymer thus obtained include sulfite salts such as sodium sulfite, sodium hydrogen sulfite, ammonium sulfite, and potassium sulfite; hydrogen sulfates such as sodium hydrogen sulfate, potassium hydrogen sulfate, and ammonium hydrogen sulfate; hydrogen phosphates such as dipotassium hydrogen phosphate and disodium hydrogen phosphate; hydrogen phosphites such as sodium hydrogen phosphite and ammonium hydrogen phosphate; amino sulfonates such as sodium taurate, sulfamic acid sodium salt, and potassium sulfanilate; and sodium thiosulfate.

Reactions to add the compounds listed above are usually carried out in solvent. As the solvent, both water and organic solvent can be used. However, the above salts to be used in the addition reaction are water soluble, water or organic solvent containing water is advantageous. The reaction is carried out normally at a temperature of 40~120° C. for 2~24 hours. If the reaction temperature is too high, the copolymer will be deteriorated. For this addition reaction, catalyst may be used. Examples of catalyst include quaternary ammonium salt such as tetrabutyl ammonium bisulfate, tetrabutyl ammonium bromide, trimethyl lauryl ammonium chloride, and benzyltriethyl ammonium chloride; and boron fluorides such as zinc tetra fluoro borate. Also, while preparing polymer, addition reaction may be carried out at the same time of polymerization by mixing salts and catalysts necessary for the addition reaction into the polymerization system.

As radical initiator containing a group of acid having nitrogen family element or chalcogen element or a group of the salt of the acid to be used in the above (the third method), there may be ammonium persulfate, potassium persulfate, ammonium perphosphate, sodium perphosphate. In the third method, introduced into a copolymer is a functional group which tends to cause addition reaction with the initiator provided in a form of radical cleavage. As a result, it is capable to introduce the radical initiator into locations other than a propagating end of the copolymer. Therefore, the content of the group of acid having nitrogen family element or chalcogen element or the group of the salt of the acid in the copolymer can be set within the above range. As the functional group, epoxy group is preferable. By copolymerizing a monomer containing epoxy group, it is possible to introduce epoxy group in the copolymer. Polymerization method thereof is, as same as above, any one of solution polymerization method, suspension polymerization method, and emulsion polymerization method may be used; the method is not particularly limited.

The copolymer as a binder of the invention has a glass transition temperature (Tg) in a range of preferably 5° C. or less, so as to improve flexibility of the electrode.

Weight-average molecular weight of the copolymer is usually 10,000 or more and 1,000,000 or less, preferably 20,000 or more and 500,000 or less. When the molecular weight is within the range, obtained is a binder which exhibits excellent strength. Also, when the binder is used as a composition for an electrode, the active material for an electrode and the electro-conductive material show high dispersiveness.

<A Binder Composition for an Electrode of a Non-Aqueous Electrolyte Secondary Battery>

A binder composition for an electrode of a non-aqueous electrolyte secondary battery of the present invention (hereinafter, simply refer to "a binder composition".) is a composition containing the above-mentioned binder of the present invention and a compound crosslinkable with this binder. The compound crosslinkable with the binder (hereinafter, refer to "crosslinking agent".) is a compound which reacts with a group of acid having nitrogen family element or chalcogen element or a group of the salt of the acid or a crosslinkable group in the binder of the invention, and which then form cross-linked structure. By forming of cross-linked structure, it is capable to improve strength of manufactured electrode. While, the binder of the invention by itself may form intermolecular cross-linked structure. For example, when a group of strong acid salt containing sulfur atom or phosphorus atom is contained as a group of acid having nitrogen family element or chalcogen element or the salt of the acid, and epoxy group is contained as a crosslinkable group, the group of strong acid salt and the epoxy group react each other and form a crosslinked structure. In such a circumstance, use of crosslinking agent is preferable because it can further raise the density and reaction rate of cross-linking.

Crosslinking agent is adequately selected depend on the group of acid having nitrogen family element or chalcogen element or the group of the salt of the acid or a crosslinkable group of a copolymer to be used as a binder. For example, when the copolymer contains epoxy group as a crosslinkable group, a compound commonly known as curing agent of epoxy resin such as polyamine, polycarboxylic acid, and polyphosphate compound can be used as a crosslinking agent. When the copolymer contains hydroxyl group as a crosslinkable group, polyisocyanate compound and polycarboxylic acid anhydride can be used as crosslinking agents. Further, when the copolymer contains a group of strong acid salt containing sulfur atom or phosphorus atom as a group of acid having nitrogen family element or chalcogen element or a group of the salt of the acid, or contains carboxylic group as a crosslinkable group, polyepoxy compound can be used as a crosslinable agent.

A composition for an electrode obtained by using a binder composition of the invention preferably has a property such that cross-linking reaction is not proceeded at a time of preparation, during storage and coating, but the reaction is proceeded when the coated composition is dried and heated after coating. In order to realize this property, depends on the necessity, blocking treatment for inhibiting reaction at about room temperature is given to the crosslinkable agent. For instance, polyamine is treated to become acetate salt, and carboxylic acid is treated to become ammonium salt so as to realize blocking. While, polyisocyanate is blocked with use of commonly known blocking agent such as phenol, sulfite salt, and ethyl acetoacetate, and is used. Furthermore, if the crosslinkable agent is a polymer, cross-linking effect can be easily occurred, thereby it is preferable without having a risk of decline of battery performance due to the remaining unused crosslinkable agent. As amount of the crosslinkable agent, to the amount of a group of acid having nitrogen family element or chalcogen element or a group of the salt of the acid or amount of a crosslinkable group of the corresponding binder, the amount of reacting group with a group of acid having nitrogen family element or chalcogen element or a group of the salt of the acid or amount of a crosslinkable group in the crosslinkable agent is normally 0.05~20 equivalent weight, preferably 0.2~5 equivalent weight.

<A Composition for an Electrode of a Non-Aqueous Electrolyte Secondary Battery>

A composition for an electrode of a non-aqueous electrolyte secondary battery of the present invention is a composition containing the above binder of the invention and an active material for an electrode. Examples of the active material for a positive electrode of the non-aqueous electrolyte secondary battery include a complex metal oxide containing lithium such as $LiCoO_2$, $LiNiO_2$, $LiMnO_2$, $LiMn_2O_4$, $LiFeVO_4$, $Li_xNi_yCo_zMn_wO_2$ (x+y+z+w=2); salts of complex metal oxoacid compound containing lithium such as $LiFePO_4$, $LiMnPO_4$, and $LiCoPO_4$; transition metal sulfide such as $TiS_2$, $TiS_3$, and amorphous $MOS_3$; transition metal oxide such as $Cu_2V_2O_3$, amorphous $V_2O$—$P_2O_5$, $MoO_3$, $V_2O_5$, $V_6O_{13}$; and such a compound whose transition metal is partly substituted by other metals. In addition, conductive polymer such as polyacethylene and poly-p-phenylene can also be used. Moreover, a material obtained by coating carbon material or inorganic compound on a part of or all over the surface thereon may be used.

Examples of an active material for a negative electrode of the non-aqueous electrolyte secondary battery include carbon materials such as amorphous carbon, graphite, natural graphite, meso-carbon-microbeads (MCMB), pitch-type carbon fiber, and conductive polymer such as polyacene. Also, the examples may be metals such as Si, Sn, Sb, Al, Zn, and W alloyable with lithium. As active material for both a positive electrode and a negative electrode, a material, where a conductive material is adhered onto the surface of the electrode by mechanical reforming, may be used. The conductive material may be the same material as the below-mentioned conductive material which is capable to be contained in a composition for an electrode.

Particle shape of the active material for an electrode of the non-aqueous electrolyte secondary battery is preferably spherical shape to make the electrodes suitably densely-filled. For diameter of the particle, it is preferably a mixture of small particles whose diameter is about 1 μm and relatively large particles whose diameter is 3~8 μm. Or, particles may have a distribution of diameter in broad range within 0.5~8 μm. When particles whose diameter is 50 μm or more are included, such larger particles are preferably removed by sifting. Tap density of an active material for an electrode is preferably 2 $g/cm^3$ or more for the positive electrode and 0.8 $g/cm^3$ or more for the negative electrode.

Amount of the above binder to be used for the composition for an electrode of the invention, to 100 weight by parts of an active material for an electrode to be used for a non-aqueous electrolyte secondary battery, is preferably 0.1~5 weight by parts, more preferably 0.2~4 weight by parts, and particularly preferably 0.5~3 weight by parts. When the amount of binder is too small, there is a fear that the active material for an electrode easily comes off from the electrode. While, the amount of binder is too excessive, the active material for an electrode may be completely covered by the binder, thereby battery reaction is disturbed and internal resistance is increased.

As a composition for an electrode of the invention, it is preferable to contain an electroconductive material. Examples of an electroconductive material include electroconductive carbon such as acetylene black, KETJENBLACK, carbon black, graphite, vapor-grown carbon fiber, carbon nanotube. Such an electroconductive material enhances electrical contact between active materials for an electrode. Therefore, by using an electroconductive material, it is capable to improve electrical contact among active materials for an electrode. Also, if such an electroconductive material is used for a non-aqueous electrolyte secondary battery, rate performance of the electric discharge can be improved. Usage of the electroconductive material is, to 100 weight by parts, usually 0~20 weight by parts, preferably 1~10 weight by parts.

The composition for an electrode of the invention further contains solvent and is normally used in a form of slurry in which the active material for an electrode and an electroconductive material are dispersed in the solvent. As solvent, preferably used is any solvent which is capable to solve the binder of the above-mentioned invention. Because such a solvent allows an active material for an electrode and an electroconductive material to excellently disperse.

If the binder of the present invention is used in a state being dissolved in a solvent, presumably, the binder is adsorbed on the surface of an active material for an electrode or the like, and the volume effect caused by that helps the stability of the dispersion.

As such solvent, both of water and organic solvent can be used. Examples of the organic solvent include: alicyclic hydrocarbons such as cyclopentane and cyclohexane; aromatic hydrocarbons such as toluene and xylene; ketones such as ethylmethyl ketone and cyclohexanon; esters such as ethyl acetate, butyl acetate, γ-butyrolactone, and ϵ-caprolactone; acylonitriles such as acetonitrile and propionitrile; ethers such as tetrahydrofuran and ethylene glycol diethylether; alcohols such as methanol, ethanol, isopropyl alcohol, ethylene glycol, and ethyleneglycol monomethylether; amides such as N-methyl pyrrolidone, N,N-dimethyl acetoamide, and N,N-dimethyl formamide. From the viewpoint of drying rate or environmental issue, these solvent may be selected and used alone or in combination with two or more thereof.

Composition for an electrode, of which active materials for an electrode and electroconductive materials are well-dispersed, becomes a state of paint having a certain viscosity at relatively high concentration of solid portion. The composition for an electrode of the invention is preferably used at the viscosity of 100~100,000 mPa·s, more preferably 1,000~20,000 mPa·s; the volume fraction of nonvolatile portion in the composition for an electrode at the time is preferably 25% or more. When the concentration of solid portion in the composition for an electrode is high, it is capable to lower the void ratio of electrode layer obtained by coating the composition onto a current collector and drying thereof. Hence, it is capable to easily obtain an electrode of which deformation volume of the electrode layer by below-mentioned press-treatment is small and diameter of bending failure limit is also small.

The composition for an electrode of the invention preferably further contains the above crosslinking agent.

Moreover, the composition may contain other binders and viscosity modifier in the range where the effect of the invention is not damaged. The viscosity modifier is not particularly limited; various kinds of surfactants or coupling agents are preferable. An example of surfactant is preferably a nonionic series surfactant such as polyoxyethylene alkylether and polyoxyethylene alkylester. While, examples of coupling agent include various coupling agents such as silane series, aluminum series, titanate series, and boron series coupling agents. In order to enhance dispersion of the active material for an electrode and the electroconductive material, these crosslinking agent, other binders, and viscosity modifiers are preferably soluble in the solvents listed above.

The composition for an electrode of the invention can be manufactured by mixing each of the above component. Mixing method and mixing order thereof are not specifically limited. If the binder of the present invention is used, it is possible to obtain a composition for an electrode in which an active material for an electrode and an electroconductive material are highly dispersed, without depending on mixing method and mixing order. Examples of mixing machines may include ball mill, sand mill, pigment dispersion machine, kneading machine, ultrasonic dispersion machine, homogenizer, planetary mixer, and planetary stirrer.

<An Electrode for a Non-Aqueous Electrolyte Secondary Battery>

An electrode for a non-aqueous electrolyte secondary battery of the present invention (hereinafter, simply refer to "electrode".) is composed by adhering an active material layers formed by using the above-described composition for an electrode to a current collector. The active material layers in the electrode of the invention contains at least the above-described binder of the invention and an active material for an electrode of the same, then the layers are preferably formed on both sides of the current collector.

As the active material for an electrode, any one of active materials for an electrode listed in the above description of a composition for an electrode of the invention can be used. The current collector is not particularly limited as long as it is electroconductive and electrochemically durable. From the viewpoint of heat-resistance, for example, it is preferable to be metal materials such as iron, copper, aluminum, nickel, stainless steel, titanium, tantalum, gold, and platinum. Among them, aluminum is particularly preferable for positive electrode of a non-aqueous electrolyte secondary battery; while copper is particularly preferable for negative electrode of the same. The shape of current collector is not specifically limited; it is preferably about 0.001~0.5 mm thickness of a sheet type shape.

In addition, the above-described binder of the invention is preferably pre-coated on the above current collector together with electroconductive particle like carbon black. By using the current collector on which a binder of the invention is pre-coated, it is possible to realize a battery which is favorable in adhesiveness of the current collector and active material layer, low ratio of damage of the electrode at a time of battery assembly, and is excellent in long-term reliability.

Thickness of the active material layer in the electrode of the invention is suitably selected depend on the type or application of non-aqueous electrolyte secondary battery to be manufactured with use of the electrode. It is preferably 50 µm or more, more preferably 60~150 µm. When the thickness of the active material layer is too thin, capacity of the non-aqueous electrolyte secondary battery manufactured with use of the electrode may become lower. On the other hand, when it is too thick, flexibility of the active material layer declines so that the layer tends to be broken and also peeling of the layer from the current collector tends to be caused.

The above-described electrode of the invention is manufactured by coating the above-described composition for an electrode onto the current collector and drying it so as to form an active material layer. In order to obtain an electrode having all the above-mentioned characteristics, solid portions such as the active material for an electrode and the electroconductive material need to be uniformly dispersed. If the dispersion is uneven, fluidity of the composition for an electrode becomes poor that lowers the efficiency of coating process, but also filling ratio of the obtained active material for an electrode becomes small, and the surface of the electrode becomes rough. As a result, the electrode after press process becomes brittle. On the other hand, a composition for an electrode in which the active materials for an electrode and electroconductive materials are sufficiently dispersed allows a stable high-speed coating. Therefore, it is capable to remarkably enhance the productivity of the electrode.

A preferable manufacturing method of an electrode of the present invention is a method by coating the composition for an electrode of the invention to the current collector and drying it with heat to form an active material layer. Coating method of the composition for an electrode to the current collector is not particularly limited. The examples thereof include doctor-blade method, dip method, reverse roll method, direct roll method, gravure method, extrusion method, and brush method. The examples of drying method include: drying by using warm wind, hot wind, and low-humidity wind; vacuum drying; and drying by irradiating (far-) infrared radiation, electron beam, and etc.

If the electrode is thermally treated after drying, it is capable to completely remove the solvent in the electrode. Moreover, when the binder or the composition for an electrode has a crosslinkable group, strength of the electrode is improved because of the cross-linking inside the binder, and it is possible to inhibit the binder to be swelled or to be dissolved by the electrolyte. Temperature of the thermal treatment is preferably 140~210° C., and the period for the thermal treatment is preferably 4~48 hours. The period for the thermal treatment is suitably adjusted depend on the group of acid containing the above nitrogen family element or chalcogen element or the salt of the acid, also depend on the crosslinkable group, the amount and types of cross-linker. Further, other than cross-linking by heat as above, cross-linking by using peroxide and by irradiating high-energy beam such as electron beam may be possible.

In the above-described manufacturing method, before or after the thermal treatment, it is preferable to have press-treatment. The press-treatment enhances the smoothness of the surface of active material layer and raises the density of an electrode. The examples of press method include die press or roll press.

The electrode of the invention can be used as an electrode for a non-aqueous electrolyte secondary battery, preferably as an electrode for lithium ion secondary battery.

<A Non-Aqueous Secondary Battery>

A non-aqueous electrolyte secondary battery of the present invention has the above-mentioned electrode of the invention, electrolyte, and a separator. In the non-aqueous electrolyte secondary battery of the invention, the above electrode of the invention is provided in either of a positive electrode or a negative electrode so as to obtain the effect of the invention. Further, in order to enhance the effect of the invention, in the non-aqueous electrolyte secondary battery of the invention, it is preferable to provide the above-described electrode at both the positive and the negative electrodes.

A non-aqueous electrolyte secondary battery can be manufactured in accordance with the normal method by using the parts like the above electrode, electrolyte, and separators. Specific manufacturing method is, for example, a negative electrode and a positive electrode are superposed each other through a separator, the set of these layers is wound or folded into a particular shape depends on the shape of battery and then put into the battery case. Then, the battery case is filled with electrolyte and sealed. If necessary, it is possible to incorporate expand metal, over-current inhibiting element such as fuse, PTC element, and lead board so as to inhibit pressure increase inside the battery and over-charging/discharging. Shape of the battery is selected from any one of coin type, button type, sheet type, cylindrical type, horn type, and flat type.

Electrolyte is not specifically limited as long as it is the one used for a normal non-aqueous electrolyte secondary battery. Depend on the type of active materials for both negative electrode and positive electrode, suitable electrolyte which exhibits a function of battery may be selected. Among such electrolytes, preferable is liquid or gel-type non-aqueous electrolyte which can be obtained by solving electrolyte salt in the organic solvent.

As examples of electrolyte salt, any kind of conventional commonly-known lithium salt can be used. Specifically, the examples include $LiClO_4$, $LiBF_4$, $LiPF_6$, $LiCF_3CO_2$, $LiAsF_6$, $LiSbF_6$, $LiB_{10}Cl_{10}$, $LiAlCl_4$, $LiCl$, $LiBr$, $LiB(C_2H_5)_4$, $LiCF_3SO_3$, $LiCH_3SO_3$, $LiC_4F_9S_3$, $Li(CF_3SO_2)_2N$, and lower aliphatic carboxylic acid lithium salt.

Organic solvent (electrolytic solution) to which these electrolyte salts are dissolved is not particularly limited. Specifically, the carbonates such as propylene carbonate, ethylene carbonate, butylene carbonate, dimethyl carbonate, ethylmethyl carbonate, diethyl carbonate; lactones such as γ-butyrolactone; ethers such as trimethoxymethane, 1,2-dimethoxyethane, diethyl ether, 2-ethoxyethane, tetrahydrofuran, and 2-methyltetrahydrofuran; and sulfoxides such as dimethylsulfoxide. Among these, carbonates are preferable because of its excellent chemical and electrochemical property as well as its thermal stability.

As a separator, commonly known materials like polyolefin microporous membrane or nonwoven fabric such as polyethylene and polypropylene; and microporous resin including inorganic ceramic powder, can be used.

EXAMPLES

The examples of the present inventions will be described as follows. However, the inventions are not limited by these examples. In the examples, "parts" and "%" are determined based on weight standard, unless otherwise specified.

Binders, compositions for an electrode, electrodes, and batteries obtained by the following examples and comparative examples were evaluated in accordance with the following evaluation method.

(Evaluation Method)

<Content of a Group of Acid Having Nitrogen Family Element or Chalcogen Element or the Salt of the Acid>

Content of a group of acid having nitrogen family element or chalcogen element or the salt of the acid was obtained in accordance with the following method. In other words, a large amount of water is added to N-methylpyrrolidone (hereinafter, refer to "NMP".) solution of the copolymer used as a binder to make the copolymer deposit. When the deposited copolymer was washed by water and the remaining salts were removed, elemental analysis was carried out. Then, the content of a group of acid having nitrogen family element or chalcogen element or the salt of the acid was calculated based on the obtained weight fraction of nitrogen family element or chalcogen element.

<Over-Time Viscosity Increasing Index of Compositions for an Electrode>

Viscosity of compositions for an electrode just manufactured and stored for 5 hours (25° C.) after the manufacturing were measured after every one minute rotation by Brookfield's "M-type viscometer" (manufactured by Tokyo Keiki Co., Lid.) being set with rotor No. 4 at rotational frequency of 60 rpm. (Viscosity of the composition stored for 5 hours)/(viscosity of the composition just manufactured) is defined as an over-time viscosity increasing index. If the over-time viscosity increasing index is closer to 1, which means that the solid portion of the electrode is uniformly dispersed and in a stable state.

<Flexibility of an Electrode>

The obtained electrode for a non-aqueous electrolyte secondary batteries were respectively cut into two test pieces having a size of 100 mm in length and 50 mm in width; then these were measured in accordance with the method described in JIS (Japanese Industrial Standard) K5600-5-1. For testing apparatus, an apparatus Type-1 was used. The test pieces were placed in the test apparatus and bent the hinge for 180° angle from the horizontal state. Then cracks made on the electrode were observed with a loupe. When the cracks were measured by changing the diameter of mandrel, the flexibility of an electrode was evaluated by the following criteria based on the diameter of mandrel with which crack was observed. An electrode on which no crack can be observed with small diameter of mandrel shows excellent flexibility.

No crack can be observed with a mandrel of diameter 3 mm: A

No crack can be observed with a mandrel of diameter 5 mm: B

No crack can be observed with a mandrel of diameter 8 mm: C

Crack can be observed with a mandrel of diameter 8 mm: D

<Peeling Strength>

An electrode was cut into a rectangle test pieces having a size of 2.5 cm in width×10 cm in length, and the individual test pieces were fixed at a particular position with the surface of its active material layer upside. After sticking a piece of cellophane adhesive tape on the surface of active material of the test piece, stress at a time of peeling the cellophane adhesive tape from an end of the test piece at a speed of 50 mm/min in 180° direction was measured. The measurement was carried out for ten times, then the obtained average was defined as the peeling strength. The larger peeling strength shows larger adhesiveness of the active material layer to the current collector.

<Surface Roughness of an Electrode>

In accordance with JIS B 0601, arithmetic average roughness (Ra) of square (20 μm×20 μm) of the surface of active material layer of an electrode was measured by atomic force microscope. When used are the same type of plural active material for an electrode, smaller Ra value shows that the active material for an electrode and the electroconductive material are uniformly dispersed in the active material layer, and also the surface of active material layer is smooth.

<Battery Performance>

Test condition for battery performance is as follows. A battery was charged up to 4.2V at 25° C. with 0.5-hour-rate constant current, and it was charged for 2 hours with 4.2V constant voltage. Then, the battery was discharged down to 2.75V with 0.5-hour-rate constant current; charging was carried out under the above condition, and again, it was discharged down to 2.75V with 2-hour-rate constant current. Fraction of the 2-hour-rate discharge capacity to the 0.5-hour-rate charge capacity is shown in percentage, and it is defined as discharge rate performance. Moreover, discharge of 0.5-hour-rate constant current as well as charge under the above condition was carried out for 100 cycles; the fraction of discharge capacity of the 100th cycle to that of the first cycle was shown in percentage and defined it as the cycle characteristic.

(Manufacturing of a Binder)

Example 1

Into an autoclave with a stirrer, 300 parts of ion-exchange water, 50 parts of ethyl acrylate, 40 parts of 2-ethylhexyl acrylate, 10 parts of glycidyl methacrylate, 3 parts of sodium dodecylbenzene sulfonate, and 1.0 part of potassium persulfate. After sufficient agitation, these were heated at 70° C. and polymerized to obtain latex. The obtained polymerization conversion rate calculated from the concentration of solid portion was about 99%. To 100 parts of this latex, 320 parts of NMP was added; and water was evaporated under reduced pressure to prepare 8% NMP solution of ethyl acrylate-acrylonitrile series copolymer (hereinafter, refer to "copolymer A".) as a binder for an electrode of a non-aqueous electrolyte secondary battery of the present invention. The copolymer A had 0.003 moles of a group of sulfate salt to 100 g solid portion. The monomer composition and so on and the content of acid or salts of the acid are shown in Table 1.

Example 2

Into an autoclave with a stirrer, 300 parts of ion-exchange water, 80 parts of n-butyl acrylate, 15 parts of acrylonitrile, 1 part of methacrylic acid-2-ammonium ethyl sulfate, 4 parts of glycidyl methacrylate, 0.5 parts of dodecyl mercaptan, 3 parts of sodium dodecylbenzene sulfonate, and 0.7 parts of α,α'-azoisobutyronitrile. After sufficient agitation, these were heated at 80° C. and polymerized to obtain latex. The obtained polymerization conversion rate calculated from the concentration of solid portion was about 99%. To 100 parts of this latex, 320 parts of NMP was added; and water was evaporated under reduced pressure to prepare 8% NMP solution of ethyl acrylate-acrylonitrile series copolymer (hereinafter, refer to "copolymer B".) as a binder for an electrode of a non-aqueous electrolyte secondary battery of the invention. The copolymer B had 0.004 moles of a group of sulfate salt to 100 g solid portion. The monomer composition and so on and the content of acid or salts of the acid are shown in Table 1.

Examples 3 and 4

Except for using monomer composition of individual Examples 3 and 4 shown in Table 1, Examples 3 and 4 were carried out in the same manner as Example 2; 8% NMP solution of ethyl acrylate-acrylonitrile series copolymer (hereinafter, refer to "copolymer C" and "copolymer D".) were prepared as a binder for an electrode of a non-aqueous electrolyte secondary battery of the invention. The copolymer C had 0.010 moles of a group of phosphate salt to 100 g solid portion. The monomer composition and the content of acid or salts of the acid are shown in Table 1. Also, the copolymer D had 0.004 moles of a group of sulfate salt to 100 g solid portion. The monomer composition and the content of acid or salts of the acid are shown in Table 1.

Comparative Examples 1 and 2

Except for using monomer composition of individual Comparative examples 1 and 2 shown in Table 1, Comparative examples 1 and 2 were carried out in the same manner as Example 2, and 8% NMP solution of ethyl acrylate-acrylonitrile series copolymers (hereinafter, refer to "copolymer E" and "copolymer F".) were prepared as a binder for an electrode of a non-aqueous electrolyte secondary battery. The copolymer F had 0.065 moles of a group of sulfate salt to 100 g solid portion. The monomer composition and so on and the content of acid or salts of the acid are shown in Table 1.

(Manufacturing of an Electrode)

Example 5

Into a 10 L high-speed mixer whose powder contact area is made of zirconia (i.e. a Henschel mixer manufactured by Mitsui Miike Machinery Co., Ltd.), 40 parts of acetylene black and 2,000 parts of $LiCoO_2$ (of which average particle diameter is 3.8 μm and tap density is 2.7 $g/cm^3$) were poured. The poured materials were mixed at 3,800 rpm for 60 minutes to obtain a mixture of active material for the positive electrode, which was composed of particles where acetylene black was adhered on the surface of the particles of $LiCoO_2$, and which was excellent in fluidity of powder.

Then, 1020 parts of this mixture was poured into a planetary mixer, 150 parts of 8% NMP solution of polymer A and NMP itself were added to it so as to set the concentration of the solid portion of the mixture to 81%; the mixture was further mixed at 60 rpm for 60 minutes. Later, NMP was gradually added so as to set the concentration of solid portion to 77% and the mixture was defoamed under reduced pressure to obtain a composition for a positive electrode having gloss and favorable fluidity of slurry. Viscosity of the composition for an electrode right after the manufacturing was 11,900 mPa·s, and over-time viscosity increasing index of the same was 1.13. This composition for an electrode was coated on both surface of a 20 μm thickness aluminum foil by comma-coater as the total thickness in dried condition will be about 110 μm. After pressing the coated aluminum foil by roll press at 60° C. to become $3.5\times10^3$ $kg/m^3$ in density of the dried active material layer and become 190 μm in thickness (including the thickness of aluminum foil), the foil was thermally treated at 150° C. for 12 hours under reduced pressure to obtain a positive electrode "a". The kinds of and evaluation results of the used binder and so on are shown in Table 2.

Example 6

Except for using $LiFePO_4$ of the average particle diameter 2.9 μm as the active material for an electrode, Example 6 was carried out in the same manner as Example 5; a mixture of active material for a positive electrode was obtained. Into a planetary mixer, 1020 parts of the mixture was poured, and 150 parts of 8% NMP solution of polymer B and NMP itself were added to it so as to set the concentration of the solid portion of the mixture to 65%; the mixture was further mixed at 60 rpm for 60 minutes. Then, NMP was gradually added so as to set the concentration of solid portion to 59% and the mixture was defoamed under reduced pressure to obtain a composition for a positive electrode having gloss and favorable fluidity of slurry. Viscosity of the composition for an electrode right after the manufacturing was 8,500 mPa·s, and over-time viscosity increasing index of the same was 0.98. This composition for an electrode was coated on both surface of a 20 μm thickness aluminum foil by comma-coater as the total thickness in dried condition will be about 110 μm. After pressing the coated aluminum foil by roll press at 60° C. to become $1.8\times10^3$ $kg/m^3$ in density of the dried active material layer and become 190 μm in thickness (including the thickness of aluminum foil), the foil was thermally treated at 150° C. for 12 hours under reduced pressure to obtain a positive electrode "b". The kinds of and evaluation results of the used binder and so on are shown in Table 2.

Example 7

Into a planetary mixer, 500 parts of mesocarbon microbeads (MCMB, manufactured by Osaka Gas Chemicals Co. Ltd.) was poured, and 125 parts of 8% NMP solution of polymer C and NMP itself were added to it so as to set the concentration of the solid portion of the mixture to 70.5%; the mixture was further mixed at 60 rpm for 60 minutes. Then, NMP was gradually added so as to set the concentration of solid portion to 63.5% and the mixture was defoamed under reduced pressure to obtain a composition for a negative electrode having gloss and favorable fluidity. This composition for an electrode was coated on both surface of a 18 μm thickness copper foil by comma-coater as the total thickness in dried condition will be about 100 μm. It was dried at 60° C. and later thermally treated at 150° C. for 12 hours to obtain original sheet for an electrode. This original sheet for an electrode was pressed by roll press so as the sheet to become $1.5\times10^3$ $kg/m^3$ in density of the active material layer and become 170 μm in thickness to obtain a negative electrode "c". The kinds of and evaluation results of the used binder and so on are shown in Table 2.

Example 8

Into a 10 L capacity of high-speed mixer whose powder contact area is made of zirconia (i.e. a Henschel mixer manufactured by Mitsui Miike Machinery Co., Ltd.), 40 parts of acetylene black and 2,000 parts of $LiCoO_2$ (of which average particle diameter is 3.8 μm and tap density is 2.7 $g/cm^3$) were poured. The poured materials were mixed at 3,800 rpm for 60 minutes to obtain a mixture of active material for the positive electrode, which was composed of particles where acetylene black was adhered on the surface of particles of $LiCoO_2$, and which was excellent in fluidity of powder.

Then, 1020 parts of this mixture was poured into a planetary mixer, 150 parts of 8% NMP solution of polymer D and NMP itself were added to it so as to set the concentration of the solid portion of the mixture to 81%; the mixture was further mixed at 60 rpm for 60 minutes. Later, NMP was gradually added so as to set the concentration of solid portion to 77%, then 0.3 parts of ethyl acetoacetate of hexamethylene diisocyanate in block portion was mixed. Finally, the mixture was defoamed under reduced pressure to obtain a composition for a positive electrode having gloss and favorable fluidity of slurry. This composition for an electrode was coated on both surface of a 20 μm thickness aluminum foil by comma-coater as the total thickness in dried condition will be about 110 μm. After pressing the coated aluminum foil by roll press at 60° C. to become $3.5\times10^3$ $kg/m^3$ in density of the dried active material layer and become 190 μm in thickness (including the thickness of aluminum foil), the foil was thermally treated at 150° C. for 12 hours under reduced pressure, to obtain a positive electrode "d". The kinds of and evaluation results of the used binder and so on are shown in Table 2.

Comparative Example 3

Except for using polymer E as a binder, Comparative example 3 was carried out in the same manner as Example 5 to obtain a positive electrode "e". The kinds of and evaluation results of the used binder and so on are shown in Table 2.

Comparative Example 4

Except for using polymer F as a binder, Comparative example 4 was carried out in the same manner as Example 5 to obtain a positive electrode "f". The kinds of and evaluation results of the used binder and so on are shown in Table 2.

Comparative Example 5

Into a planetary mixer, 500 parts of mesocarbon microbeads (MCMB, manufactured by Osaka Gas Chemicals Co. Ltd.) was poured, and 125 parts of 12% NMP solution of PVDF (commodity type:KF1300 manufactured by Kureha Corporation) and NMP itself were added to it so as to set the concentration of the solid portion of the mixture to 70.5%; the mixture was further mixed at 60 rpm for 60 minutes. Then, NMP was gradually added so as to set the concentration of solid portion to 63.5% and the mixture was defoamed under reduced pressure to obtain a composition for a negative electrode having gloss and favorable fluidity. This composition for an electrode was coated on both surface of a 18 μm thickness copper foil by comma-coater as the total thickness in dried condition will be about 100 μm. It was dried at 60° C. and later thermally treated at 150° C. for 2 hours to obtain original sheet for an electrode. This original sheet for an electrode was pressed by roll press to obtain a 170 μm thick negative electrode "g". The kinds of and evaluation results of the used binder and so on are shown in Table 2.

Comparative Example 6

Except for using PVDF (commodity type:KF1300 manufactured by Kureha Corporation) as a binder, Comparative example 6 was carried out in the same manner as Example 5 to obtain a positive electrode "h". The kinds of and evaluation results of the used binder and so on are shown in Table 2.

(Manufacturing of Battery)

Example 9

The positive electrode a obtained in accordance with Example 5 was cut into a size of 54 mm in width×480 mm in length. Then, an electrode layer on one side only of the electrode was scraped off in an area up to 10 mm from an end of the electrode in the longitudinal direction to expose the current collector. While, the negative electrode c obtained in accordance with Example 7 was cut into a size of 56 mm in width×510 mm in length. In the same manner as the positive electrode, an electrode layer on one side only of the electrode was scraped off in an area of 10 mm width to expose the current collector. Later, the above positive and negative electrodes were placed to hold a separator in between such that surface of both electrodes each of whose current collector was not exposed were opposed each other and the positions of the current collectors to be exposed were placed so as to oppose each other in the longitudinal direction. Another separator was further laminated on the electrode layer of the negative electrode where the current collector was exposed. As the separator, 20 μm thick porous polyethylene sheet was used.

By using the exposed surface of the current collector of the positive electrode as a starting point, a set of the above electrodes and separators were then spirally wound around 2.5 mm diameter of an aluminum current collecting stick, and a multilayered electrode whose outermost surface was the negative electrode was obtained. The spirally wound multilayered electrode was inserted into a stainless-steel battery case in a shape of 18 mm in outer diameter and 67 mm in height of cylinder having a bottom surface on one end. Then, a lead plate of the positive electrode and a lead plate of the negative electrode were respectively welded. After connecting the individual electrode tabs, and deaerating the case. Electrolyte was injected into it, then, a sealing cap was installed to complete a cylindrical lithium ion secondary battery. As the electrolyte, used is a solution containing $LiPF_6$ being dissolved at a concentration of 1 mole/L in a mixed solvent having ethylene carbonate (EC) and diethyl carbonate (DEC) at ratio of EC:DEC=1:2 (a volumetric ratio at 20° C.) as an electrolytic solution. The discharging rate performance and cycle characteristic of the manufactured lithium ion secondary battery was measured. Kinds of and evaluation result of the used positive and negative electrodes are shown in Table 3.

Examples 10~12, Comparative Examples 7~8

Except for using a positive and a negative electrodes particularly specified in Table 3, Examples 10~12 and Comparative examples 7~8 were carried out in the same manner as Example 9 to make lithium ion secondary battery. Then, the discharging rate performance and cycle characteristic thereof were measured. Kinds and evaluation result of the used positive and negative electrodes are shown in Table 3.

(Table 1)

TABLE 1

| | | Example 1 Polymer A | Example 2 Polymer B | Example 3 Polymer C | Example 4 Polymer D | Comparative example 1 Polymer E | Comparative example 2 Polymer F |
|---|---|---|---|---|---|---|---|
| Monomer (part) | Ethyl acrylate | 50 | | 45 | 82 | | |
| | Butyl acrylate | | 80 | 45 | | | 30 |
| | 2-ethylhexyl acrylate | 40 | | | | 79 | 40 |
| | Acrylonitrile | | 15 | 5 | 15 | 20 | 10 |
| | Glycidyl methacrylate | 10 | 4 | 3 | | | 5 |
| | Methacrylic acid-2-ammonium ethyl sulfate | | 1 | | 1 | | 15 |
| | Methacrylic acid-2-ethyl phosphate | | | 2 | | | |
| | 2-hydroxyethyl acrylate | | | | 2 | | |
| | Methacrylic acid | | | | | 1 | |
| Polymerization initiator (part) | Potassium persulfate | 1 | | | | | |
| | α,α'-azoisobutyronitrile | | 0.7 | 0.7 | 0.7 | 0.7 | 0.7 |
| Content of a group of acid or a group of salts of the acid (mole) | | 0.003 | 0.004 | 0.010 | 0.004 | 0.00 | 0.065 |

TABLE 2

|  | Example 5 | Example 6 | Example 7 | Example 8 | Comparative example 3 | Comparative example 4 | Comparative example 5 | Comparative example 6 |
|---|---|---|---|---|---|---|---|---|
| Binder (to be added at a time of dispersion of active material for an electrode) | Polymer A | Polymer B | Polymer C | Polymer D ※ | Polymer E | Polymer F | PVDF | PVDF |
| Active material | $LiCoO_2$ | $LiFePO_4$ | MCMB | $LiCoO_2$ | $LiCoO_2$ | $LiCoO_2$ | MCMB | $LiCoO_2$ |
| Solvent | NMP | NMP | NMP | NMP | NMP | NMP | NMP | NMP |
| Viscosity of a composition for an electrode (mPa · s) | 11900 | 8500 | 5200 | 7900 | 8800 | 16500 | 6300 | 13400 |
| Over-time viscosity increase index | 1.13 | 0.98 | 1.1 | 1.22 | 1.6 | 0.71 | 0.96 | 1.1 |
| Electrode | a | b | c | d | e | f | g | h |
| Surface roughness of an electrode Ra (μm) | 1.2 | 1.1 | 4.2 | 1.2 | 1.9 | 2.6 | 4.2 | 1.7 |
| Peeling strength (N/m) | 10 | 21 | 15 | 20 | 3 | 5 | 4 | 5 |
| Flexibility of an electrode | A | A | A | A | A | B | C | D |

※ Polymer D includes a compound crosslinkable with copolymers.

According to the result shown in Table 2, in the electrodes of the present invention (Examples 5~8), the surface roughness of the electrodes was small, active material for an electrode and so on were uniformly dispersed in the active material layers, and the surface of the active material layers was smooth. In addition, over-time viscosity increasing index of each compositions for an electrode was good. Moreover, the peeling strength was high, and flexibility of the electrode was good. On the other hand, in Comparative examples 3~6, results of any one of evaluation items were not sufficient. In case of using MCMB as an active material (Example 7 and Comparative example 5), the reason for having larger surface roughness of the electrodes is that the particle diameter of MCMB as an active material is larger than those of other active materials.

(Table 3)

TABLE 3

|  | Electrode composition | | Cycling | |
|---|---|---|---|---|
|  | Positive electrode | Negative electrode | Discharge rate (%) | characteristics (%) |
| Example 9 | Electrode a | Electrode c | 93.5 | 95.6 |
| Example 10 | Electrode b | Electrode g | 92.1 | 94.1 |
| Example 11 | Electrode d | Electrode c | 93.7 | 95.2 |
| Example 12 | Electrode e | Electrode c | 92.6 | 93.6 |
| Comparative example 7 | Electrode f | Electrode g | 90.1 | 87.8 |
| Comparative example 8 | Electrode h | Electrode g | 88.6 | 85.9 |

According to Table 3, in both of discharge rate performance and cycle characteristic of batteries of the present invention (Examples 9~12), the results were good. On the other hand, in Comparative examples 7 and 8, results of any one of evaluation items were not sufficient.

INDUSTRIAL APPLICABILITY

The binder for an electrode of a non-aqueous electrolyte secondary battery of the present invention is excellent in dispersiveness of active material for an electrode. By using this binder, it is capable to make an electrode of the present invention in which active material for an electrode can be filled so as to be high density, and which exhibits excellent strength and surface smoothness. Further, by using this electrode, it is capable to make a non-aqueous electrolyte secondary battery having excellent discharge rate performance and cycle characteristic. A secondary battery having such performances is becoming a major player of the compact size secondary battery for electronic devices. This battery is also expected to be used for power system of automobiles and so on.

The invention claimed is:

1. A binder for an electrode of a non-aqueous electrolyte secondary battery comprising a copolymer, wherein said copolymer contains 0.0005~0.05 moles of group of an acid having a phosphorus atom or a sulfur atom or 0.0005~0.05 moles of group of salts of said acid per 100 g of said copolymer;
wherein said copolymer contains 50~99.9 weight % of structural unit represented by a general formula (A) shown as follows:

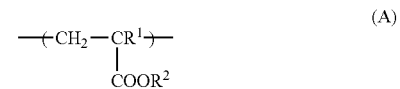

(A)

wherein $R^1$ is a hydrogen atom or a methyl group, $R^2$ is an alkyl group or a cycloalkyl group of carbon number 1-16.

2. The binder for an electrode of a non-aqueous electrolyte secondary battery according to claim 1, wherein said group of an acid is selected from the group consisting of a sulfate group, a sulfonate group, a phosphate group, an acidic phosphoester group, and a phosphonate group.

3. The binder for an electrode of a non-aqueous electrolyte secondary battery according to claim 1, wherein, in the structural unit of said copolymer represented by said general formula (A), amount of the structural unit represented by said general formula (A) whose $R^2$ is an alkyl group of carbon number 1~6 is 50 weight % or more.

4. The binder for an electrode of a non-aqueous electrolyte secondary battery according to claim 1, wherein said copolymer further contains a cross-linking group.

5. The binder for an electrode of a non-aqueous electrolyte secondary battery according to claim 4, wherein said cross-linking group is at least one selected from a group consisting of an epoxy group and a hydroxyl group.

6. A binder composition for an electrode of a non-aqueous electrolyte secondary battery containing the binder for an electrode of a non-aqueous electrolyte secondary battery described in claim 1 and a compound crosslinkable with said binder for an electrode of a non-aqueous electrolyte secondary battery.

7. A composition for an electrode of a non-aqueous electrolyte secondary battery containing the binder for an electrode of a non-aqueous electrolyte secondary battery described in claim 1 and an active material for an electrode.

8. An electrode for a non-aqueous electrolyte secondary battery, wherein an active material layer formed with use of a composition for an electrode of a non-aqueous electrolyte secondary battery described in claim 7 is adhered to a current collector.

9. A non-aqueous electrolyte secondary battery comprising the electrode for a non-aqueous electrolyte secondary battery described in claim 8, an electrolytic solution, and a separator.

10. The binder for an electrode of a non-aqueous electrolyte secondary battery according to claim 2, wherein, in the structural unit of said copolymer represented by said general formula (A), amount of the structural unit represented by said general formula (A) whose $R^2$ is an alkyl group of carbon number 1~6 is 50 weight % or more.

11. The binder for an electrode of a non-aqueous electrolyte secondary battery according to claim 2, wherein said copolymer further contains a cross-linking group.

12. The binder for an electrode of a non-aqueous electrolyte secondary battery according to claim 11, wherein said cross-linking group is at least one selected from a group consisting of an epoxy group and a hydroxyl group.

13. A binder composition for an electrode of a non-aqueous electrolyte secondary battery containing the binder for an electrode of a non-aqueous electrolyte secondary battery described in claim 2 and a compound crosslinkable with said binder for an electrode of a non-aqueous electrolyte secondary battery.

14. A composition for an electrode of a non-aqueous electrolyte secondary battery containing the binder for an electrode of a non-aqueous electrolyte secondary battery described in claim 2 and an active material for an electrode.

15. An electrode for a non-aqueous electrolyte secondary battery, wherein an active material layer formed with use of a composition for an electrode of a non-aqueous electrolyte secondary battery described in claim 14 is adhered to a current collector.

16. A non-aqueous electrolyte secondary battery comprising the electrode for a non-aqueous electrolyte secondary battery described in claim 15, an electrolytic solution, and a separator.

\* \* \* \* \*